United States Patent [19]

Kirman et al.

[11] Patent Number: 4,594,898
[45] Date of Patent: Jun. 17, 1986

[54] FORCE SENSORS

[75] Inventors: Richard G. Kirman, Chelmsford; Roger M. Langdon, Colchester, both of England

[73] Assignee: Fisher Controls International, Inc., Marshalltown, Iowa

[21] Appl. No.: 617,712

[22] Filed: Jun. 6, 1984

[30] Foreign Application Priority Data

Jun. 7, 1983 [GB] United Kingdom ............... 8315565

[51] Int. Cl.[4] ............................................. G01L 1/10
[52] U.S. Cl. ................................... 73/778; 73/862.59
[58] Field of Search ............ 73/778, 702, 862.59, 73/DIG. 1, DIG. 4, 579, 651, 652, 654, 517 R; 310/338

[56] References Cited

U.S. PATENT DOCUMENTS

| | | | |
|---|---|---|---|
| 3,190,129 | 6/1965 | Kritz et al. ..................... | 73/517 AV |
| 3,470,400 | 9/1969 | Weisbord ......................... | 73/778 |
| 3,529,470 | 9/1970 | Agar ................................. | 73/862.59 |
| 4,071,838 | 1/1978 | Block ............................... | 73/517 R |
| 4,215,570 | 8/1980 | Eer Nisse ........................ | 73/862.59 |
| 4,372,173 | 2/1983 | Eer Nisse et al. .............. | 73/862.59 |
| 4,446,394 | 5/1984 | Albert .............................. | 310/338 |

FOREIGN PATENT DOCUMENTS 823847 11/1959 United Kingdom .
2115551 9/1983 United Kingdom .

Primary Examiner—Stephen A. Kreitman
Attorney, Agent, or Firm—Marshall, O'Toole, Gerstein, Murray & Bicknell

[57] ABSTRACT

A piezoelectric beam structure for a vibrating beam force sensor in which three coplanar beams of piezoelectric material are spaced side by side and supported between respective common mountings at either end. The two outer counterbalancing beams in operation flex in opposite phase to the center main beam, with each beam flexing in a direction normal to the beam plane. A force sensor which includes this piezoelectric beam structure.

13 Claims, 10 Drawing Figures

FORCE SENSORS

This invention concerns force sensors, and relates in particular to sensors in which the variation of a flexing beam's natural resonance frequency when the beam is put under tension is used to indicate the amount of that tension.

BACKGROUND OF THE INVENTION

Vibrating beam force sensors are quite known—the basic idea was described over twenty years ago—and since the early 1960's, these devices (in which in essence a beam or strip of a piezoelectric material mounted at either end is piezoelectrically driven into flexural vibration while under tension, a change in the vibrational frequency indicating a change in the tensioning forces), have found a wide range of uses.

Unfortunately the simplest form of the device, a single strip-like beam mounted at either end—tends to have a relatively low Q (the factor used to indicate the amount of energy locked in the vibrating structure relative to the amount of energy that must be fed in to maintain the vibrations), and the energy is lost mainly by transfer to the mountings at either end. Much effort has gone into designing beam-like structures that do not suffer from the low Q problem—that do not cause a large proportion of the input energy to be passed to and absorbed by the mountings—and much of this effort has centered on the idea of providing some sort of counterbalanced vibrating element such that the vibrations of both this and the beam effectively cancel each other at the mountings, so that no energy is transferred to the mountings and the whole structure has a high Q.

Although these counterbalanced, or compensated, structures do undoubtedly have the desired high Q, they are nevertheless all quite complex, and difficult and costly to manufacture. One such structure, put forward in the early 1960's, uses the tuning fork principle (two similar members vibrating to and from each other, in antiphase) by having two beams mounted at their ends in common mountings and disposed one above but spaced from the other. Like the arms of a tuning fork, the two beams flexurally vibrate in their common plane—that is, towards and away from each other. Because they are in antiphase (180° out of phase) the vibrations sent to each mounting by one beam are exactly equal but opposite to those sent by the other beam, and so they cancel out, and no energy is transferred to the mountings. Another structure, suggested in the early 1970's, tries to solve the Q problem by securing the beam to each mounting via a torsion member at right angles to the beam's long axis, and by then providing a counterweight beam section beyond each torsion member. Yet another structure, also suggested in the 1970's, proposed a variant on the last one, mounting the beam at each end via two "isolator springs" spaced above and below the beam plane and then having two counterweights extending from these towards the beam center. Structures such as these are not only difficult and expensive to manufacture from the raw piezoelectric material blank, but in some cases the positioning thereon of the necessary electrodes (both by which the beams can be driven and by which the vibration's actual frequency can be observed) is made particularly irksome because of the complex shapes involved.

It appears that all of the high Q structures suggested so far involve balancing beams or counterweights that are in the vibrational plane of the "main" beam, and flex in that plane. This seems to have made all these structures unnecessarily complex, and it is the hope of the present invention that it can provide a mechanically simpler, and cheaper, but no less efficient beam structure by placing counterbalancing beams not above and below the main beam but on either side thereof.

SUMMARY OF THE INVENTION

In one aspect, therefore, this invention provides a piezoelectric beam structure for a vibrating beam force sensor, of the type wherein a beam or strip of a piezoelectric material mounted at either end is piezoelectrically driven into flexural vibration while under stress, a change in the vibrational frequency indicating a change in the stressing force, wherein the structure has at least three coplanar beams spaced side by side and supported between common mountings one at either end for flexural vibration in a plane normal to the beams' common plane.

Each beam is of a strip-like nature (similar to a rule/ruler), having length, breadth (or width) and depth (or thickness); the length is large relative to the breadth, and the breadth is large relative to the thickness. The plane of the beam may therefore loosely be defined as that plane in which the length and breadth dimensions exist. In the beam structure of the invention, the planes of all the beams lie in a common plane. Each beam is intended to flex (vibrate) in the direction of its depth—thus, normal to its plane. In the invention, each beam is intended to flex normal to the common plane. The two outer beams (the counterbalance beams) are, however, intended in operation to flex in antiphase, i.e., opposite in phase, to the center beam (the main beam), whereby the energy transferred by the main beam to its mounting is equal but opposite to—and thus is cancelled by—the energy fed to the same mounting by the two counterbalance beams.

In use the beam structure will have associated therewith the various electrodes necessary for its operation. Their nature and positioning will be fairly conventional, and this is discussed further hereinafter.

The inventive beam structure may be fabricated from any piezoelectric material used or suggested for use in the art, and it is one considerable advantage of the invention that it allows the use of relatively small, and cheap, portions of these materials. Typical piezoelectrics suitable for use are single crystal quartz, lithium niobate, lithium tantalate and aluminum orthophosphate.

The inventive structure has three coplanar beams spaced side-by-side. Alternatively, there could be any number of beams (provided there are at least three)—there could, for example be four (with two inner main beams and two outer counterbalance beams), five (with one central main beam, two inner counterbalance beams, and two outer counterbalance beams perhaps in phase with the central main beam)—but three seem quite satisfactory.

As has been mentioned hereinbefore, the three beams are coplanar, and spaced side-by-side. This means (amongst other things) that the structure as a whole can be made simply by taking a piezoelectric strip blank having the length of a beam plus its mountings and the breadth of the structure's three beam combination and simply removing material therefrom so as to form two side-by-side slots therein running parallel with the blank's long axis (and suitably spaced either side thereof); these two slots naturally define three parallel beams. Methods of so forming the beam structure are discussed in more detail hereinafter.

The three beams are supported between common mountings one at either end. These mountings are in fact very conveniently portions of piezoelectric material integral with the beams themselves, and are the means by which the structure itself is mounted in or on the device in which it is to act as the active component of a force sensor. It may be desirable for the mountings to be necked—to have an axial portion of less breadth than the rest—between where it joins the beam structure and where it is itself mounted in or on the device.

Being supported between common mountings the three beams generally are of the same length (which is whatever is suitable for the desired fundamental flexural frequency—0.250 inch (6.35 mm) seems quite acceptable). However, the three beams are preferably not the same breadth; to ease the problem of matching the energy in the main beam to that in the two counterblance beams it is preferred that the mass, and thus the breadth, of each of the latter two be half that of the former one. With 6.35 mm long, 0.125 mm thick beams, a main beam breadth of 0.040 inch (1 mm) and a counterbalance beam breadth of 0.020 inch (0.5 mm) were satisfactory.

Structures with larger length-to-breadth ratios tend to have the higher Q values.

The beam structure of the invention may be manufactured in a number of ways. One may employ an air-abrasion technique, in which the piezoelectric material blank is held between a backing plate and a slotted mask and a jet of abrasive particles is blown through the slots in the mask to remove the unwanted material. Air abrasion can cause damage to the material surfaces which significantly increases mechanical power losses in the vibrating beams, and hence reduces the attainable Q factor, but these losses can be greatly reduced by a subsequent chemical polishing.

Another manufacturing method uses a photolithographic process. This technique involves depositing a suitable mask onto the piezoelectric material blank, and etching away the unprotected material with an appropriate etch solution. When the piezoelectric material is quartz, a suitable mask is an evaporated gold-on-nichrome layer electroplated with gold to increase the thickness and reduce the penetration of the etch through pinholes, and a satisfactory etch is hot aqueous ammonium bifluoride.

In a force sensor device using an inventive beam structure the latter is mounted (at either end) so that the force applied to the device, and to be measured, is transmitted to the beams. One such device has the beam structure mounted across a shallow slot in the surface of a cantilever beam; application of force to the free end of the cantilever produces a strain in the beam structure which can be calculated with reasonable accuracy from the device geometry. The material of the cantilever should have a thermal coefficient of linear expansion in the strain direction that is closely matched to that of the beam structure in order to minimize the temperature coefficient of vibration frequency, and to guard against the possibility of cracking the piezoelectric material at extremes of temperature. Indeed, the cantilever could be of the same material and crystal orientation as the beam structure, in which case the stress induced by temperature change would be zero. Even then, however, there could be a temperature-dependent frequency change, so ideally the cantilever is made from a material with a thermal expansion coefficient such that the actual differential expansion produces a stress which in turn produces a frequency shift that effectively cancels the temperature coefficient of the unstrained device.

A quite different type of mounting is one wherein the beam structure is fixed across the free ends of two rigid levers pivoted together, the force to be measured being applied to the levers to separate them (and thus produce a strain in the beam structure). A somewhat similar type of mounting particularly suitable for measuring pressures is one wherein the beam structure is attached to a diaphragm via a short pillar at either end of the beam structure. The pressure to be measured is applied to the diaphragm, and acts to rotate the pillars about their points of attachment to the diaphragm, thus producing a strain in the beam structure.

Examples of these two mounting systems are discussed hereinafter with reference to the accompanying drawings.

The inventive beam structure is fabricated from a piezoelectric material, and is driven into flexure by electrical signals delivered to electrodes mounted on the structure. The mechanism by which flexural vibrations occurs is now well known. Briefly, however, it involves producing an electric field across the depth of the beam between an electrode on one face and a matching electrode on the other face so causing the volume of the piezoelectric material between the electrodes to distort sideways in shear, and the forces arising from this distortion then cause the beam to move bodily up (or down). The beam will thus flex at the frequency of the applied signals, and this flexing will have maximum amplitude when the signal frequency is a resonance frequency of the beam.

It is conventional to place a pair of driving electrodes near but to one side of the beam center, to place a pair of pick-up electrodes in the equivalent position on the other side of the beam center, and to use the signal obtainable at the pick-up electrodes in a feedback loop to direct the driving signal's frequency to, and maintain it at, a chosen beam resonance frequency. Any force applied to the beam changes its resonance frequency, and this can be used as a measure of that force. In the inventive beam structure, of course, each of the three (or more) beams may have its own driver and pick-up electrode pairs, which may be formed in position by any of the usual techniques, and the signal circuit used (an example of which is discussed further hereinafter with reference to the accompanying drawings) applies the counterbalance beam signals in antiphase to the main beam signals. Moreover, it is possible—and, indeed, desirable—to have all the electrodes on one surface of the beam structure combined into a common electrode (advantageously maintained at earth potential). Furthermore, it is possible—surprising though this may seem at first—to drive only either the main beam or the counterbalance beams rather than all three, for the energy fed into the flexing of one of these is transferred laterally across the end mountings into the other, and provided the driving frequency is correctly chosen this transferred energy will itself drive the other into antiphase flexure. One interesting corrollary of this is that the driving electrodes can be decoupled from the pickup electrodes by placing one on the main beam and the other on one of the counterbalance beams.

The advantages of the beam structure of the invention over those presently used in the prior art may be summarized as follows:

1. Because of the relatively small size of the beam structure it can be made from cheaper starting materials, it uses less quartz to produce a smaller device, and several devices can be made from each blank, so spreading the processing costs per device.
2. Because of the mechanical simplicity of the beam structure it can be made using photolithographic processes, and the electrode pattern deposited very simply.
3. Because the beam structure is inherently thin, it can be mounted on assemblies themselves cheap to construct.

The invention exends, of course, to a force sensor when employing a beam structure as described and claimed herein.

BRIEF DESCRIPTION OF THE DRAWINGS

Various embodiments of the invention are now described, though only by way of illustration, with reference to the accompanying drawings in which.

DETAILED DESCRIPTION

Figure 1A:
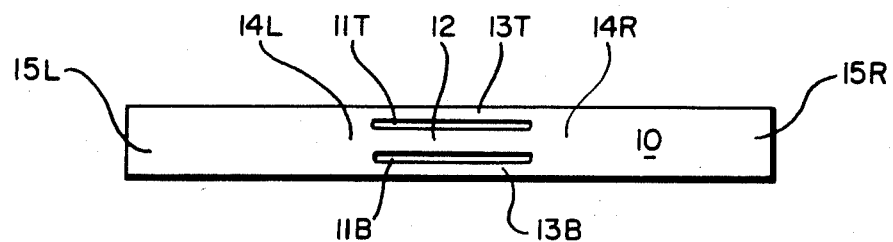
FIGS. 1A and B show plan views of two different piezoelectric beam structures of the invention.

Two shapes for the beam structure of the invention are shown in outline in FIGS. 1A and B. That of FIG. 1A is a strip 10 of piezoelectric material that has had two centrally located narrow slots 11T,B cut into it parallel to but spaced either side of the strip long axis; the strip material between and outside the slots are the beams—the main beam 12 in the center and the two counterbalance beams 13T,B on either side. The three beams have at each end a common mounting 14L,R which is contiguous with the strip end portions 15L,R by which the strip is mounted in or on the device in which it is used.

Figure 1B:
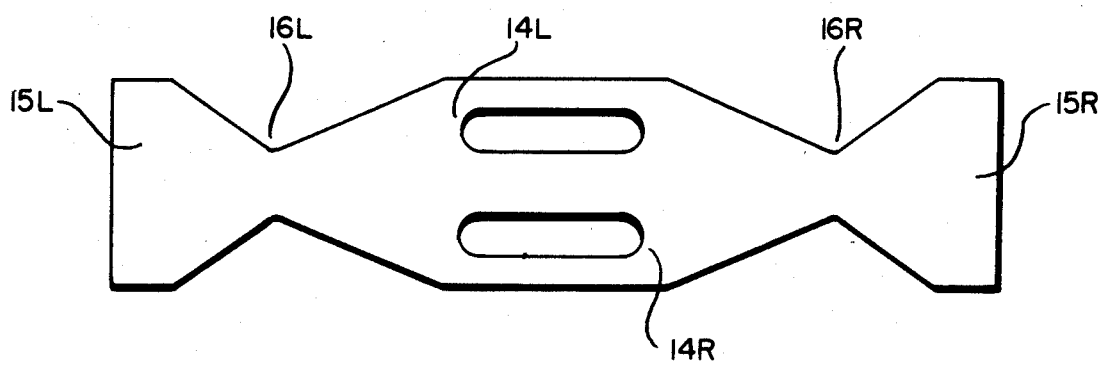

The strip of FIG. 1B is a wider, longer version of that of FIG. 1A with the addition of a neck 16L,R of material separating each beam mounting 14L,R from the relevant strip end portion 15L,R.

Figure 2A:
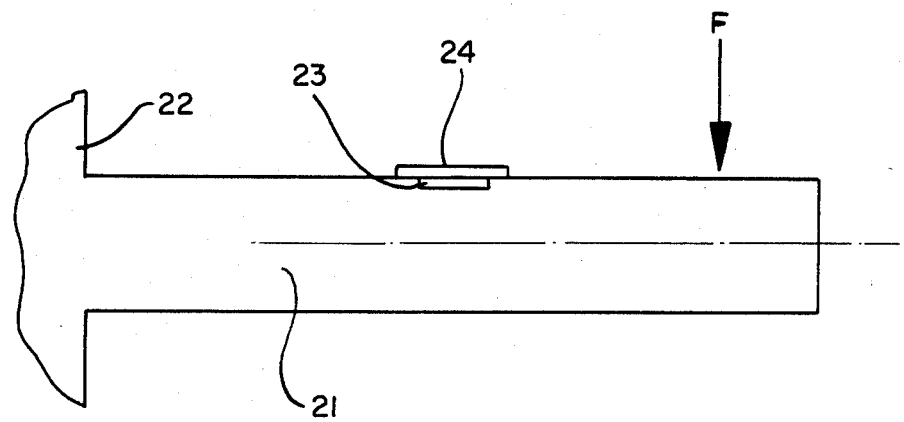
FIGS. 2A, B and C show side elevation, part section and part plan views respectively of a beam structure like that of FIG. 1A mounted on a cantilever beam.
Figure 2B:
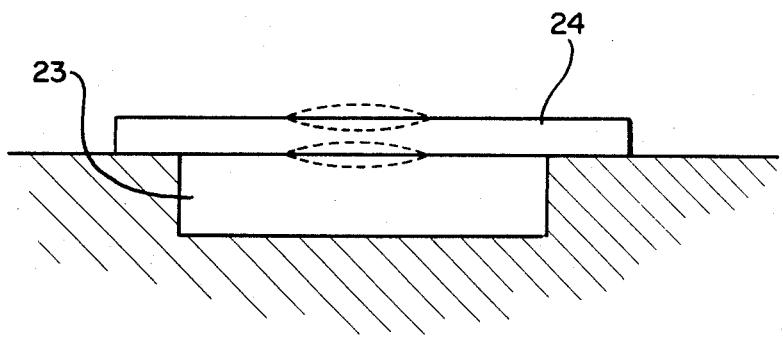
Figure 2C:
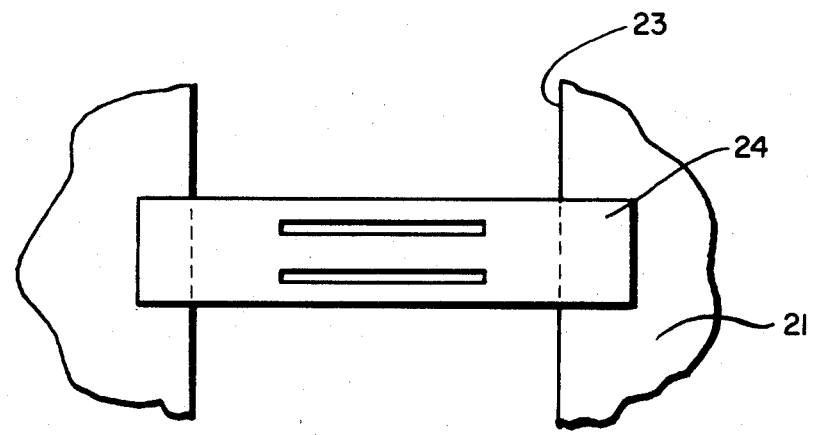

FIGS. 2A, B and C show (in side elevation, part section and part plan respectively) a beam structure like that of FIG. 1A mounted over a slot in a cantilever. The cantilever 21 is rigidly mounted at one end on a support 22, and moves up and down (as viewed) under the influence of force F. Along the cantilever a slot or notch 23 is cut in the surface, and bridging that slot (and affixed to the cantilever surface portions on either side) is an inventive beam structure 24 in accordance with the present invention. The details of this are shown more clearly in FIGS. 2B and C (the former shows how the beam structure 24 is free to flex).

Figure 3A:
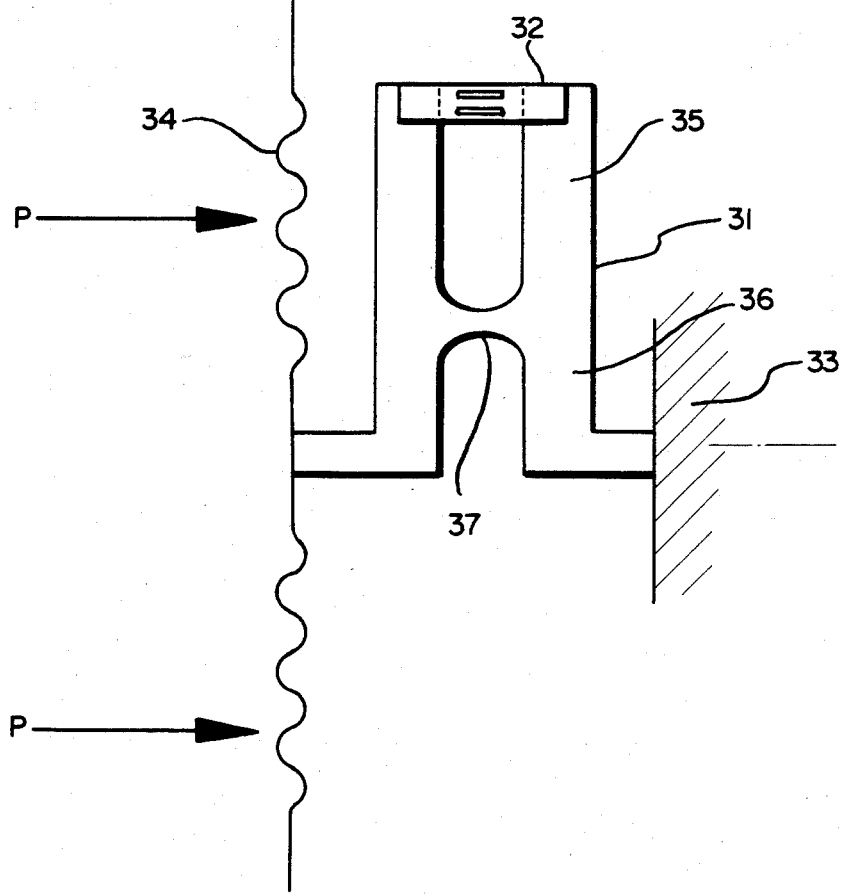
FIGS. 3A and B each show in elevation a beam structure like that of FIG. 1A mounted in different ways on a diaphragm.

An alternative type of mounting arrangement employs a flexible frame such as that shown in FIG. 3A. Forces applied at the ends of the frame 31 are coupled more-or-less directly into the beam structure 32 but no large forces are generated by differential thermal expansion. A flimsy structure of this kind would probably be most appropriate in an atmospheric pressure transducer, where one end of the frame is attached to a rigid mount 33 and the other is attached to a pressure diaphragm 34. The force produced by the pressure diaphragm is coupled into the beam structure by the magnification ratio given by the relative lengths of the lever arms 35, 36, and provided that the cross piece 37 is relatively thin no large forces will be generated in the beam structure by thermal expansion.

Figure 3B:
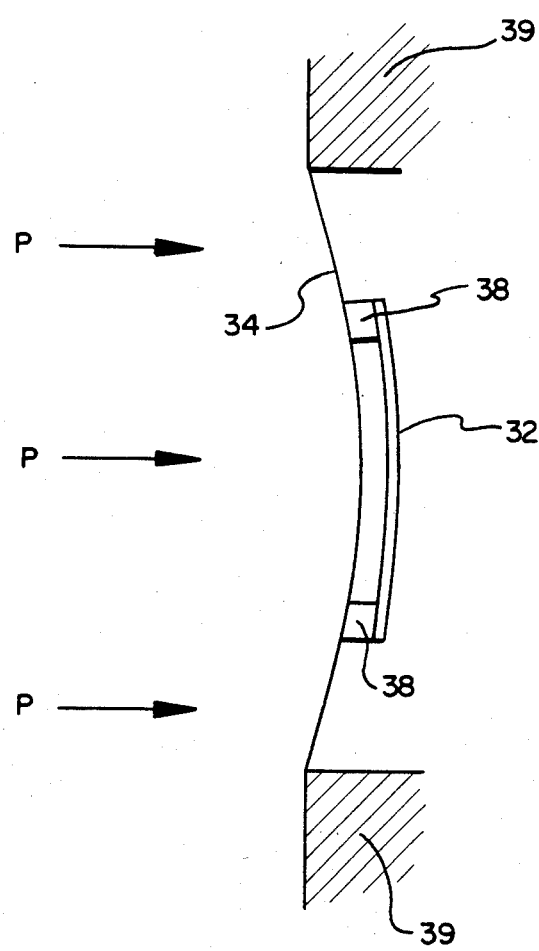

A simpler structure suitable for measuring pressures is shown in FIG. 3B. A beam structure 32 (like those in FIGS. 1A and 1B, shown in side elevation), is attached via pillars 38 to a diaphragm 34 itself mounted on a support 39. The pillars 38 are preferably formed integrally with the diaphragm and/or with the beam structure 32. Applied pressure P acts to rotate the pillars, and therefore to extend the beam structure.

Figure 4A:
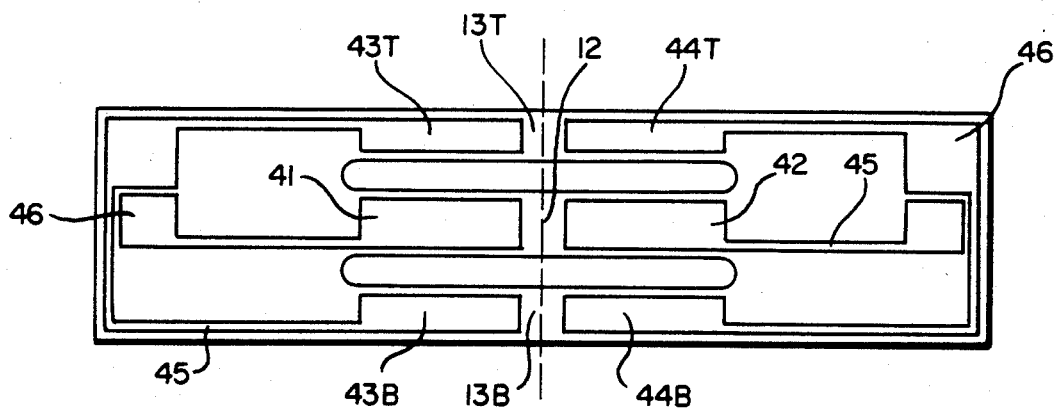
FIGS. 4A and B show the electrode distribution on two beam structures each like that of FIG. 1A.

Two layouts for the beam structure electrodes are shown in FIGS. 4A and B. In FIG. 4A each beam is driven and carries a pick-up electrode; the main beam 12 has a drive electrode 41 just to the left (as viewed) of its center line and a pick-up electrode 42 just to the right, while each counterbalance beam 13T,B has its own drive 43T,B and pick-up 44T,B electrode. Each of the drive and pick-up electrodes is connected via a thin conducting track (as 45) to a pad (as 46) to which in use a wire to the relevant circuitry is attached.

Figure 4B:
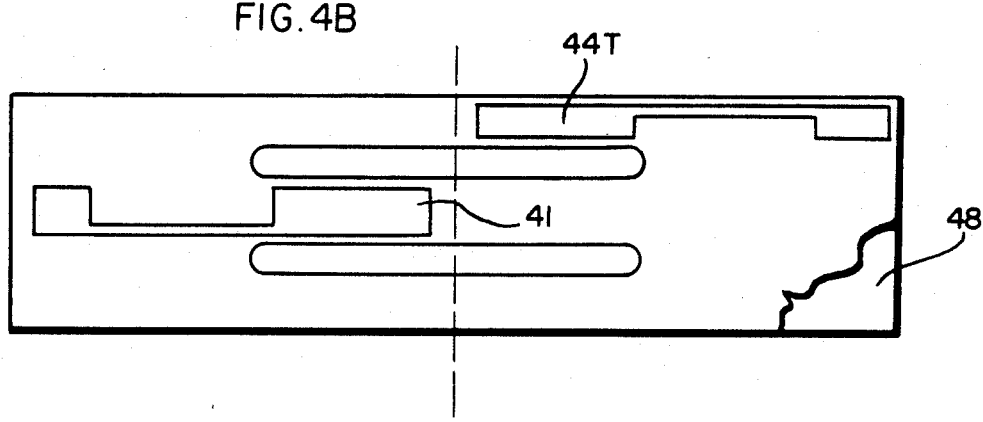

The electrode layout of FIG. 4B has a single drive electrode 41 driving the main beam and a single pick-up electrode 44T on the upper right (as viewed) counterbalance beam. By correctly choosing the driving frequency for the main beam the two outer beams automatically flex in antiphase—and having the pick-up electrode on one of these electrically decouples it from the drive electrode.

In both FIGS. 4A and B, the opposite bottom side of the beam structure not seen carries a single common electrode extending over the whole surface, illustrated as electrode 48 in the fragmented corner of FIG. 4B.

Figure 5:
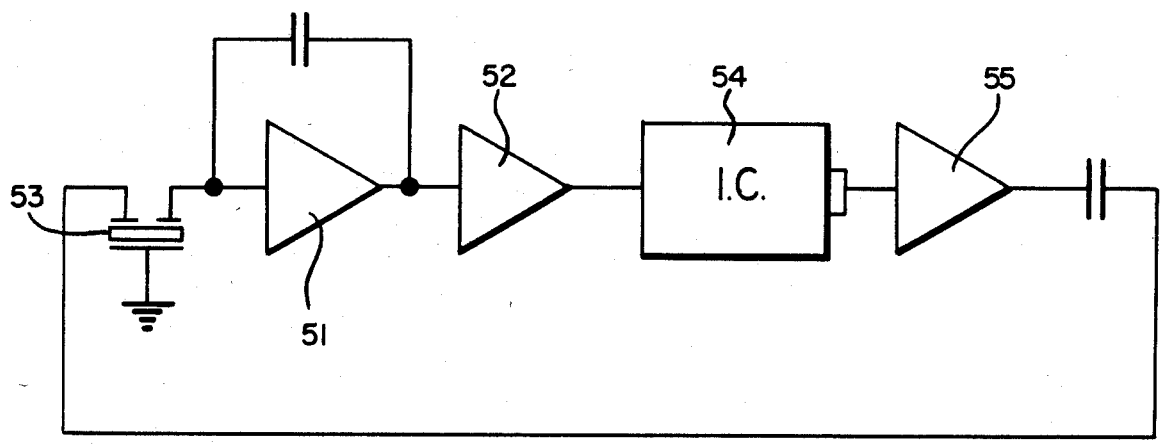
FIG. 5 shows in block diagram form a circuit for use with a beam structure of the invention.

When in use in a force sensor device, the beam structure is maintained in vibration by means of a tracking oscillator circuit which follows the changes in resonance frequency of the vibrating beams produced by the applied strain, so that the drive frequency is always identical to the mechanical resonance frequency. The well-known circuit shown schematically in FIG. 5 can be used for this. The circuit consists of a charge amplifier 51 followed by an amplifier 52 with a band-pass characteristic chosen to reject frequencies outside the operating range and with a gain sufficient to ensure operation of the driving phase-locked loop integrated circuit chip 54—which may be a CD 4046. The band-pass characteristic of the amplifier 52 is necessary to ensure that the device does not oscillate either at higher harmonics or at some resonance frequency of the whole structure.

The voltage-controlled oscillator in the phase-locked loop is centered on the middle of the operating frequency range, and locked to the beam mechanical resonance frequency by the amplifier's output signal. The square wave output from this oscillator is filtered by active filter 55 to remove the harmonics, and re-applied to the beam structure's drive electrode.

The loop phase shift of the circuit is arranged so that the oscillator frequency is set at the resonance frequency of the beam structure and tracks the changes in resonance frequency produced by the applied strain. The oscillator output provides the strain-dependent output signal of the sensor.

What is claimed is:

1. A beam structure for a vibrating beam force sensor of the type wherein a beam or strip of a piezoelectric material mounted at either end is piezoelectrically driven into flexural vibration while under stress, a change in the vibrational frequency indicating a change in the stressing force, wherein the structure comprises at least three coplanar beams, a common pair of mountings for these beams, and the beams are spaced side by side and supported between the common mountings one at either end of the beams for flexural vibration in a plane normal to the beams' common plane, and wherein the three coplanar beams generally are of the same length, but the breadth of each of the two outer beams is half that of the inner one, said beams in operation flexing in a direction normal to the plane of the beams, with the two outer beams flexing in opposite phase to the inner beam.

2. A beam structure as claimed in claim 1, fabricated from single crystal quartz.

3. A beam structure as claimed in claim 1, wherein the respective common mountings at either end comprise portions of piezoelectric material formed integral with the piezoelectric material of the beams.

4. A beam structure as claimed in claim 1, wherein at least one beam carries a pair of driving electrodes on opposite beam surfaces near but to one side of the beam center, and at least one beam carries a pair of pick-up electrodes on opposite beam surfaces in the equivalent position near but to one side of the beam center.

5. A beam structure as claimed in claim 4, wherein all the electrodes on one surface of the beam structure are combined into a common electrode.

6. A beam structure as claimed in claim 1, wherein only one beam is driven through the driving electrodes, and the pick-up electrodes are on a different beam.

7. A force sensor including a piezoelectric beam structure as claimed in claim 1.

8. A piezoelectric beam structure for a vibrating beam force sensor comprising:
a strip of piezoelectric material;
a pair of substantially parallel, longitudinal slots in said strip forming three coplanar beams of piezoelectric material spaced side by side on said strip, said beams in operation flexing in a direction normal to the plane of the beams; and
said three coplanar beams including a main beam between said slots and a respective counterbalancing beam on either side thereof, thereby defining three substantially parallel beams, wherein the mass of each counterbalancing beam is formed to be one-half the mass of the main beam.

9. A piezoelectric beam structure for a vibrating beam force sensor according to claim 8, including electrical drive means for flexing the counterbalancing beams opposite in phase to the main beam.

10. A piezoelectric beam structure for a vibrating beam force sensor according to claim 9, wherein said electrical drive means includes a pair of driving electrodes associated with each beam, and further including a pair of pick-up electrodes associated with each beam.

11. A piezoelectric beam structure for a vibrating beam force sensor according to claim 9, wherein said electrical drive means includes a pair of driving electrodes associated with at least one of said beams, and further includes a pair of pick-up electrodes associated with at least another of said beams.

12. A force sensor including a piezoelectric beams structure according to claim 8, and a tracking oscillator circuit.

13. A piezoelectric beam structure according to claim 8, formed from single crystal quartz.

* * * * *